US012520178B2

(12) United States Patent
Feng et al.

(10) Patent No.: US 12,520,178 B2
(45) Date of Patent: Jan. 6, 2026

(54) TIME ALLOCATION METHOD, EQUIPMENT, DEVICE, AND STORAGE MEDIUM BASED ON AN ON-BOARD DEVICE

(71) Applicant: BEIJING UNIVERSITY OF POSTS AND TELECOMMUNICATIONS, Beijing (CN)

(72) Inventors: Zhiyong Feng, Beijing (CN); Qixun Zhang, Beijing (CN); Xinna Wang, Beijing (CN); Ping Zhang, Beijing (CN); Zhiqing Wei, Beijing (CN); Sai Huang, Beijing (CN); Yifan Zhang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 449 days.

(21) Appl. No.: 18/030,236

(22) PCT Filed: Aug. 30, 2021

(86) PCT No.: PCT/CN2021/115314
§ 371 (c)(1),
(2) Date: Apr. 4, 2023

(87) PCT Pub. No.: WO2022/179072
PCT Pub. Date: Sep. 1, 2022

(65) Prior Publication Data
US 2023/0370877 A1    Nov. 16, 2023

(30) Foreign Application Priority Data
Feb. 26, 2021    (CN) .......................... 202110218872.5

(51) Int. Cl.
*H04W 24/08*        (2009.01)
*H04W 72/0446*      (2023.01)
(52) U.S. Cl.
CPC ....... *H04W 24/08* (2013.01); *H04W 72/0446* (2013.01)
(58) Field of Classification Search
CPC .... H04W 24/08; H04W 72/0446; H04W 4/40
See application file for complete search history.

(56) References Cited

U.S. PATENT DOCUMENTS

| 6,246,955 B1 | 6/2001 | Nishikawa et al. |
| 2003/0163512 A1* | 8/2003 | Mikamo ............... G06F 9/5066 |
| | | 718/102 |

(Continued)

FOREIGN PATENT DOCUMENTS

| CN | 105007590 A | 10/2015 |
| CN | 105490715 A | 4/2016 |

(Continued)

OTHER PUBLICATIONS

"Research on Vehicle-Mounted Millimeter-Wave Radar Signal Processing Algorithm," A Master Thesis submitted to Univ. of Electronic Science and Technology of China, Jun. 2018, 73 pages.

(Continued)

*Primary Examiner* — Christine Ng
(74) *Attorney, Agent, or Firm* — Cozen O'Connor

(57) ABSTRACT

Embodiments of the present application provide a time allocation method, device, device, and storage medium based on an on-board device. The method includes: constructing a target function of a plurality of on-board devices; determining the plurality of time allocation ratios contained in the value set, in the order from small to large, as the time allocation ratio to be tested respectively; inputting the determined time allocation ratio to be tested into the target (Continued)

function of the plurality of on-board devices, obtaining a target function value of each on-board device; judging whether the target function value of the on-board device satisfies both a preset condition, and the first constraint corresponding to the on-board device; if the result of the judgment is negative, returning to execute the step of determining the plurality of time allocation ratios contained in the value set, in the order from small to large, as the time allocation ratio to be tested respectively; if the result of the judgment is positive, determining the current time allocation ratio to be tested as a time allocation result of the on-board device.

9 Claims, 3 Drawing Sheets

(56) References Cited

U.S. PATENT DOCUMENTS

| | | | |
|---|---|---|---|
| 2004/0064817 A1* | 4/2004 | Shibayama | G06F 9/5066 |
| | | | 718/107 |
| 2010/0008286 A1 | 1/2010 | Abedi | |
| 2011/0105139 A1* | 5/2011 | On | H04W 72/541 |
| | | | 455/450 |
| 2012/0144180 A1* | 6/2012 | Tang | G06F 13/4282 |
| | | | 713/2 |
| 2013/0157678 A1* | 6/2013 | Kim | H04W 72/51 |
| | | | 455/452.1 |
| 2013/0279381 A1* | 10/2013 | Sampath | H04W 56/00 |
| | | | 370/336 |
| 2015/0032437 A1* | 1/2015 | Kumar | G06F 30/3308 |
| | | | 703/14 |
| 2015/0229439 A1* | 8/2015 | Stolpman | H04L 1/203 |
| | | | 714/776 |
| 2016/0080257 A1* | 3/2016 | Farmanbar | H04W 28/021 |
| | | | 370/236 |
| 2017/0041248 A1 | 2/2017 | Toy | |
| 2018/0077085 A1* | 3/2018 | Hayashi | H04L 43/0876 |
| 2022/0078653 A1* | 3/2022 | Ly | H04W 48/12 |

FOREIGN PATENT DOCUMENTS

| | | |
|---|---|---|
| CN | 108289325 A | 7/2018 |
| CN | 111050391 A | 4/2020 |
| CN | 111741446 A | 10/2020 |
| CN | 112055335 A | 12/2020 |
| CN | 112350789 A | 2/2021 |

OTHER PUBLICATIONS

Banerjee, A. et al., "Millimeter-Wave Transceivers for Wireless Communication, Radar, and Sensing," 2019 IEEE Custom Integrated Circuits Conference (CICC), Austin, TX, USA, 2019, pp. 1-11.

Ghafoor, K.Z. et al., "Millimeter-Wave Communication for Internet of Vehicles: Status, Challenges and Perspectives," IEEE Internet of Things Journal, vol. 7, No. 9, pp. 8525-8546, Sep. 2020.

Sun, H., "Research on Time Resource Allocation Method and Reliable Communication Technology of the Sensing and Communication Integrated System," Thesis for Master Degree, Beijing University of Posts and Telecommunications, Jun. 16, 2020, 76 pages. No translation available.

\* cited by examiner

TIME ALLOCATION METHOD, EQUIPMENT, DEVICE, AND STORAGE MEDIUM BASED ON AN ON-BOARD DEVICE

The present application claims the priority to a Chinese patent application No. 202110218872.5 filed with the State Intellectual Property Office of People's Republic of China on Feb. 26, 2021 and entitled "Time Allocation Method, Equipment, Device, and Storage Medium Based On An On-Board Device", which is incorporated herein by reference in its entirety.

TECHNICAL FIELD

The present application relates to the technical field of intelligent transportation, and in particular, to a time allocation method, equipment, device, and storage medium based on an on-board device.

BACKGROUND

With the development of intelligent transportation, communicative interconnection between various vehicles are established by means of on-board devices, achieving integral sensing and communication and thus achieving sharing of sensing information between various vehicles and improving vehicles' beyond-horizon sensing capabilities.

In the process of achieving integral sensing and communication, appropriately allocating a time allocation ratio of each on-board device $T_C/T_D$ (wherein $T_C$ represents a detection duration of detecting sensing information of an on-board device, and $T_D$ represents an overall duration from detecting sensing information to transmitting sensing information of the on-board device) and ensuring that the quantity of sensing information of each on-board device can be completely transmitted during a duration of communication of transmitting sensing information and other information of each on-board device, help balance the performance of integral sensing and communication. Therefore, a solution that appropriately allocates a time allocation ratio of each on-board device needs to be provided.

SUMMARY

An objective of embodiments of the present application is to provide a time allocation method, equipment, device, and storage medium based on an on-board device, so as to provide a solution that appropriately allocates a time allocation ratio of each of the on-board devices.

The specific technical solutions are as follows:

In a first aspect, an embodiment of the present application provides a time allocation method based on an on-board device, including:
  constructing target functions of a plurality of on-board devices; wherein, the target function of each of the on-board devices contains a sensing total information rate expression of the plurality of on-board devices, and a first constraint and a second constraint corresponding to the on-board device; the sensing total information rate expression contains an expression that represents a time allocation ratio to be tested of each of the on-board devices; the first constraint is that a communication information rate of the on-board device is not smaller than a sensing information rate of the on-board device; the second constraint is that any time allocation ratio to be tested belongs to a preset value set containing a plurality of time allocation ratios;
  determining the plurality of time allocation ratios contained in the value set, in the order from small to large, as the time allocation ratio to be tested respectively;
  inputting a determined time allocation ratio to be tested into the target functions of the plurality of on-board devices respectively, to obtain a target function value of each of the on-board devices;
  for the target function value of each of the on-board devices, judging whether the target function value of the on-board device satisfies both a preset condition, and the first constraint corresponding to the on-board device;
  if the result of the judgment is that the target function value of the on-board device does not satisfy both a preset condition, and the first constraint corresponding to the on-board device, returning to execute the step of determining the plurality of time allocation ratios contained in the value set, in the order from small to large, as the time allocation ratio to be tested respectively;
  if the result of the judgment is that the target function value of the on-board device satisfies both a preset condition, and the first constraint corresponding to the on-board device, determining the current time allocation ratio to be tested as a time allocation result of the on-board device.

In some embodiments of the present application, the preset condition is:
  achieving maximization of the sensing total information rate of the plurality of on-board devices.

In some embodiments of the present application, the second constraint is:

$$\forall a_n \in \Omega_t = \left[\frac{1}{N_s}, \frac{2}{N_s}, \ldots, \frac{N_s-1}{N_s}\right],$$

wherein, $\Omega_i$ represents the value set, $N_s$ represents the number of sub-frames contained in a communication frame, and $a_n$ represents a time allocation ratio to be tested of a nth determination.

In some embodiments of the present application, the target function of each of the on-board devices is:

$$\max_a R^{rad}$$

$$\text{s.t.} C1: R_i^{rad} \leq R_i^{rad}$$

$$C2: \forall a_n \in \Omega_t = \left[\frac{1}{N_s}, \frac{2}{N_s}, \ldots, \frac{N_s-1}{N_s}\right]$$

wherein $R^{rad}$ represents a sensing total information rate, a represents the time allocation ratio to be tested, $R_i^{rad}$ represents a sensing information rate of an ith on-board device, $R_i^{com}$ represents a communication information rate of the ith on-board device, C1: $R_i^{rad} \leq R_i^{com}$ represents the first constraint, and $$C2: \forall a_n \in \Omega_t = \left[\frac{1}{N_s}, \frac{2}{N_s}, \ldots, \frac{N_s-1}{N_s}\right]$$

represents the second constraint.

In a second aspect, an embodiment of the present application provides a time allocation equipment based on an on-board device, comprising: a function constructing module, a first determining module, a calculating module, a judging module, a second determining module, wherein, the function constructing module is configured to construct target functions of a plurality of on-board devices; wherein, the target function of each of the on-board devices contains a sensing total information rate expression of the plurality of on-board devices, and a first constraint and a second constraint corresponding to the on-board device; the sensing total information rate expression contains an expression that represents a time allocation ratio to be tested of each of the on-board devices; the first constraint is that a communication information rate of the on-board device is not smaller than a sensing information rate of the on-board device; the second constraint is that any time allocation ratio to be tested belongs to a preset value set containing a plurality of time allocation ratios;

the first determining module is configured to determine the plurality of time allocation ratios contained in the value set, in the order from small to large, as the time allocation ratio to be tested respectively;

the calculating module is configured to input the determined time allocation ratio to be tested into the target functions of the plurality of on-board devices respectively, to obtain a target function value of each of the on-board devices;

the judging module is configured to, for the target function value of each of the on-board devices, judge whether the target function value of the on-board device satisfies both a preset condition, and the first constraint corresponding to the on-board device; if the result of the judgment is that the target function value of the on-board device does not satisfy both a preset condition, and the first constraint corresponding to the on-board device, the first determining module is triggered; if the result of the judgment is that the target function value of the on-board device satisfies both a preset condition, and the first constraint corresponding to the on-board device, the second determining module is triggered;

the second determining module is configured to determine the current time allocation ratio to be tested as a time allocation result of the on-board device.

In some embodiments of the present application, the preset condition is:

achieving maximization of the sensing total information rate of the plurality of on-board devices.

In some embodiments of the present application, the second constraint is:

$$\forall a_n \in \Omega_t = \left[\frac{1}{N_s}, \frac{2}{N_s}, \ldots, \frac{N_s-1}{N_s}\right],$$

wherein, $\Omega_t$ represents the value set, $N_s$ represents the number of sub-frames contained in a communication frame, and $a_n$ represents a time allocation ratio to be tested of a nth determination.

In some embodiments of the present application, the target function of each of the on-board devices is:

$$\max_a R^{rad}$$

-continued $$\text{s.t.} C1: R_t^{rad} \leq R_t^{rad}$$

$$C2: \forall a_n \in \Omega_t = \left[\frac{1}{N_s}, \frac{2}{N_s}, \ldots, \frac{N_s-1}{N_s}\right]$$

wherein, $R^{rad}$ represents the sensing total information rate, a represents the time allocation ratio to be tested, $R_i^{rad}$ represents a sensing information rate of the ith on-board device, $R_i^{com}$ represents a communication information rate of the ith on-board device, C1: $R_i^{rad} \leq R_i^{com}$ represents the first constraint, and $$C2: \forall a_n \in \Omega_t = \left[\frac{1}{N_s}, \frac{2}{N_s}, \ldots, \frac{N_s-1}{N_s}\right]$$

represents the second constraint.

In a third aspect, an embodiment of the present application provides electronic device, comprising a processor, a communication interface, a memory, and a communication bus, wherein the processor, the communication interface, and the memory complete communicate with each other through the communication bus;

the memory is configured to store computer programs;
the processor is configured to implement any one of the method steps described in the first aspect when executing the program stored in the memory.

In a fourth aspect, an embodiment of the present application provides a computer-readable storage medium, wherein a computer program is stored in the computer-readable storage medium, and when the computer program is executed by a processor, any one of the method steps in the first aspect is implemented.

In a fifth aspect, an embodiment of the present application provides a computer program product, wherein the computer program product includes computer instructions, and the computer instructions are used to cause a computer to implement any one of the method steps in the first aspect.

In the time allocation method based on an on-board device provided by embodiments of the present application, the target function of each of the on-board devices is limited by the first constraint corresponding to the on-board device. That is, after inputting the determined time allocation ratio to be tested into the target function of each of the on-board devices, the target function value of each of the on-board device is valid only in the case that the communication information rate of the on-board device is not smaller than the sensing information rate of the on-board device; for the target function value of each of the on-board devices, it is judged whether the target function value of the on-board device satisfies both the preset condition and the first constraint corresponding to the on-board device, until the result of the judging is that the target function value of the on-board device satisfies both the preset condition and the first constraint corresponding to the on-board device, and then, the current time allocation ratio to be tested is determined as the time allocation result of the on-board device. Thus, in the case that the quantity of sensing information of each of the on-board devices is completely transmitted during a communication duration of each of the on-board devices transmitting sensing information and other information, the time allocation ratio of each of the on-board devices is optimized by iteration. Therefore, embodiments of present application provide a solution that appropriately allocates time allocation ratios of various on-board devices.

Of course, any product or method implementing the present application does not need to achieve at the same time all the above-described advantages.

BRIEF DESCRIPTION OF THE DRAWINGS

In order to describe the technical solutions of embodiments of the present application or of the related art more clearly, the accompanying drawings required in the description of the embodiments and of the prior art will be briefly introduced below. Obviously, the accompanying drawings described below are for some embodiments of the present application and other drawings may be obtained by those of ordinary skills in the art based on these drawings without any creative effort.

DETAILED DESCRIPTION

The technical solutions in the embodiments of the present application will be described clearly and completely with reference to the drawings in the embodiments of the application. Apparently, the described embodiments are only some of the embodiments of the application, not all of them. Based on the embodiments in this application, all other embodiments obtained by persons of ordinary skill in the art without making creative efforts belong to the scope of protection of the present application.

In order to achieve the above-described objective, embodiments of the present application provide a time allocation method, equipment, device, and storage medium based on an on-board device. The method and equipment can be applied to various types of electronic devices, which are not specifically limited.

An application scenario of a time allocation method based on an on-board device provided by the present application can be that: communicative interconnection is established among a plurality of vehicles by means of a plurality of on-board devices, wherein, a vehicle can correspond to an on-board device, or to a plurality of on-board devices.

Each on-board device can carry a sensing device (for example, a radar or other sensor) and a communication device (for example, a device with a communication function such as an on-board telephone). Each on-board device can contain a transmitter and a receiver. In this embodiment, the transmitter comprises a transmitting antenna set that is shared by the sensing device and the communication device and can be used to transmit a sensing signal and a communication signal; the receiver comprises a receiving antenna set that is shared by the sensing device and the communication device and can be used to receive a sensing signal and a communication signal.

A sensing signal can be a signal transmitted by a sensing device by means of the transmitting antenna based on which the surrounding environment of a vehicle can be detected so as to obtain sensing information (such as location information of an object near the vehicle). A communication signal can be a signal transmitted by a communication device by means of the transmitting antenna based on which sensing information or other information (such as communication information of an on-board telephone) can be transmitted.

The time allocation method based on an on-board device is presented below by means of specific embodiments. The various steps in the method embodiments below only need to be executed in a logical order. Neither the numbering of steps nor the order of presenting each step constitutes a limitation on the order of execution of the various steps.

Figure 1:
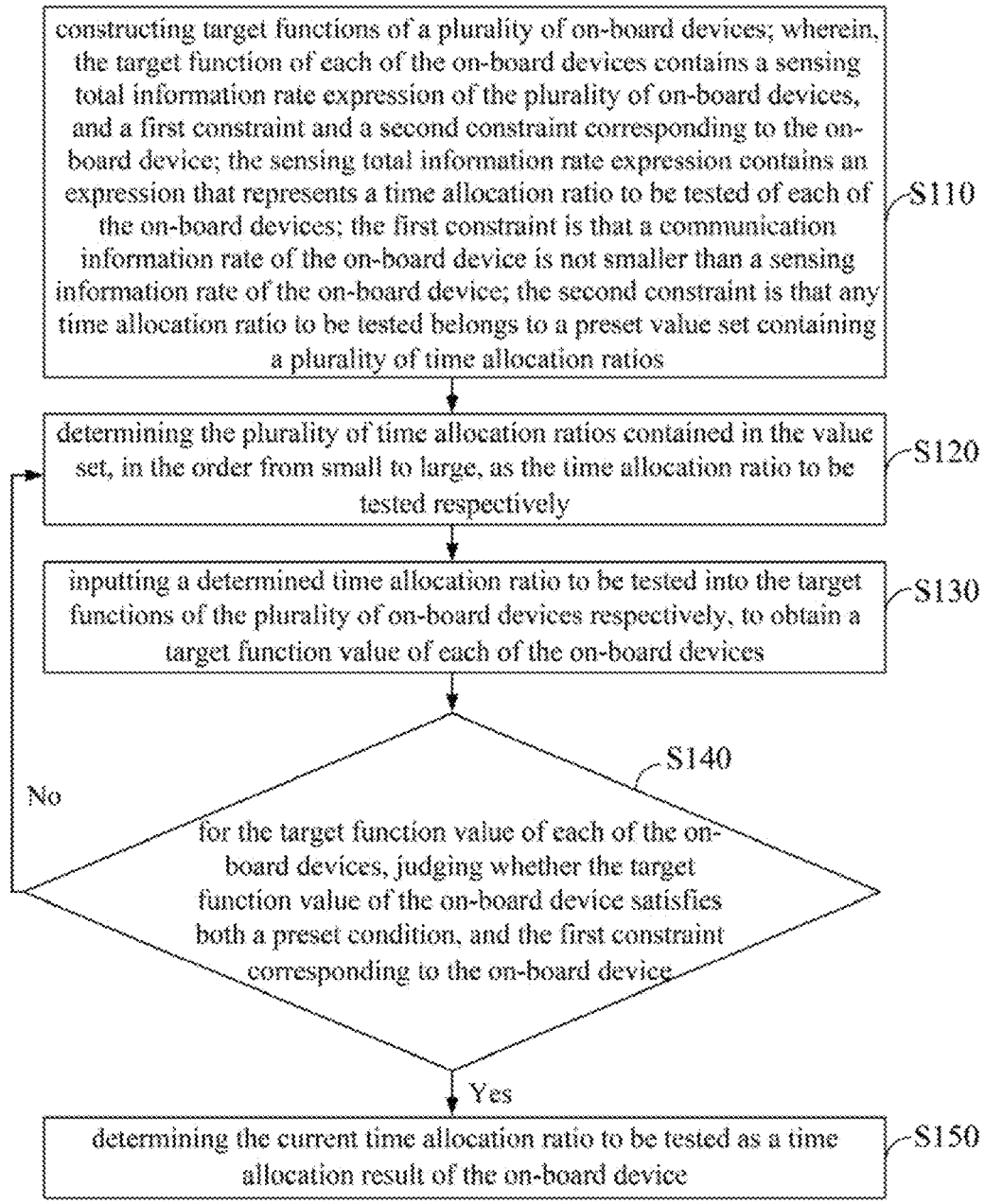
FIG. 1 is a schematic view of a flow chart of a time allocation method based on an on-board device provided by an embodiment of the present application.

In reference to FIG. 1, FIG. 1 is a schematic view of a flow chart of a time allocation method based on an on-board device provided by an embodiment of the present application, including:

S110: constructing target functions of a plurality of on-board devices; wherein, a target function of each of the on-board devices contains a sensing total information rate expression of the plurality of on-board devices, and a first constraint and a second constraint corresponding to the on-board device; the sensing total information rate expression contains an expression that represents a time allocation ratio to be tested of each of the on-board devices; the first constraint is that a communication information rate of the on-board device is not smaller than a sensing information rate of the on-board device; the second constraint is that any time allocation ratio to be tested belongs to a preset value set containing a plurality of time allocation ratios.

As an example, assume that a total of N on-board devices establish communicative interconnection so as to support the sharing of sensing information among various vehicles. The N on-board devices are numbered sequentially. Each on-board device can be represented as the ith on-board device, $i \in \varepsilon[1, 2, \ldots, N]$, and the detection duration in which the ith on-board device detects sensing information can be represented as $a_i$. Thus, the series of detection durations of the N on-board devices can be represented as a first series: $[a_1, a_2, \ldots, a_N]$. Assume that a communication frame contains $N_s$ sub-frames. The detection duration $a_i$ of each on-board device in $[a_1, a_2, \ldots, a_N]$ can be normalized so that the normalized value $\bar{a}_i$ obtained by normalizing any $a_i$ satisfies $$\bar{a}_i \in \left[\frac{1}{N_s}, \frac{2}{N_s}, \ldots, \frac{N_s - 1}{N_s}\right].$$

Figure 2:
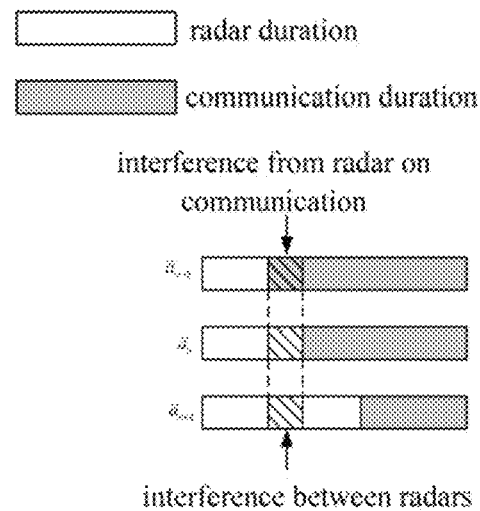
FIG. 2 is a schematic view of analysis of potential interference provided by an embodiment of the present application.

Each $\bar{a}_i$ is arranged in the order from small to large and re-numbered, obtaining a second series: $[\bar{a}_1, \bar{a}_2, \ldots, \bar{a}_N]$, wherein, $\bar{a}_1$ is the smallest detection duration, and $\bar{a}_N$ is the largest detection duration. At the same time, $\bar{a}_0 = 0$ and $\bar{a}_{N-1} = 1$, can also be introduced as two additional constants. A index set corresponding to $[\bar{a}_1, \bar{a}_2, \ldots, \bar{a}_N]$ is set as $I = [I_1, I_2, \ldots, I_N]$. As the detection duration of detecting sensing information and the transmitting duration of transmitting sensing information of each of the on-board devices are different, the time allocation ratio $T_C/T_D$ of each of the on-board devices is different as well. $I_i$ can be used to represent the time allocation index corresponding to the ith on-board device. In this case, analysis of potential interference during the detection duration of detecting sensing information of each of the on-board devices and during the communication duration of transmitting sensing information and other information of each of the on-board devices at different time allocation for each of the on-board devices is performed:

As an example, the sensing device carried on each of the on-board devices can be a radar; "radar duration" can be used to represent the detection duration of detecting sensing information of a radar and "communication duration" can be used to represent the duration of transmitting sensing information and other information of an on-board device. In reference to FIG. 2, for the ith on-board device in its radar duration, two types of interference exist during the time range of $\bar{a}_n - \bar{a}_{n-1}$, $1 \leq n \leq I_i$: when the time allocation index of another on-board device (the jth on-board device) is smaller than a, inference of a communication signal of the jth on-board device on a sensing signal of the ith on-board device during the communication duration of the jth on-board device; when the time allocation index of another on-board device (the jth on-board device) is larger than n, inference of a sensing signal of the jth on-board device on a sensing signal of the ith on-board device during the radar duration of the ith on-board device.

The maximum of a communication information rate (the rate of transmission of communication information in a channel of a communication signal) can be expressed using the Shannon's formula, that is, as shown by Formula 1 below:

$$C_{com} = B_{com} \log_2(1+SINR_{com}) \quad \text{Formula 1}$$

wherein, $B_{com}$ represents a frequency bandwidth occupied by a communication signal, and $SINR_{com}$ represents a Signal to Interference plus Noise Ratio (SINR) of a communication signal with interference.

A sensing signal can perform measurement on a detection target (for example, an obstacle near a vehicle) so as to obtain relevant information (such as location information) of the detection target and reduce prior uncertainty of the detection target. In a situation, a channel of a sensing signal can be treated as a non-cooperative communication channel. The sensing estimation rate of the sensing signal (a physical quantity that estimates the rate of transmission of sensing information in a channel of the sensing signal by means of an entropy representing random parameters and their uncertainty) can then be expressed as shown by Formula 2 below:

$$R_{est} = \frac{I(X;X+N)}{T_{pri}} \leq \frac{1}{2T_{pri}} \log_2(1+SNR) \quad \text{Formula 2}$$

wherein, I represents the quantity of information between sensing signals of the detection target and a radar, X represents a signal transmitted by a transmitter, X+N represents a signal received by a receiver, N represents noise, $T_{pri} = T_{pulse}/\delta$ represents the pulse repetition interval of the radar, $T_{pulse}$ represents the pulse duration of the radar, $\delta$ represents an operating coefficient of the radar, SNR represents the Signal-to-Noise ratio (SNR) of the sensing signal with interference. When an interference signal other than white Gaussian noise is present in the sensing signal, SNR can be expressed as SINR.

Similar to the way of expressing the communication information rate, an estimated sensing information rate (the rate of transmission of sensing information in a sensing signal) can be expressed as shown by Formula 3 below:

$$C_{rad} = B_{rad} \log_2(1+SINR_{rad}) \quad \text{Formula 3}$$

wherein, $B_{rad}$ represents a frequency bandwidth occupied by the sensing signal, and $SINR_{rad}$ represents the Signal to Interference plus Noise Ratio (SINR) of the sensing signal with interference.

As an example, as millimeter-wave communication uses a narrow beam and is capable of minimizing cross interference, millimeter waves can be used to achieve transmission of sensing signals and communication signals. Considering that millimeter waves have relatively good beam directivity, in interference analysis, the main lobe gain used when transmitting sensing signals and communication signals by millimeter waves are mainly discussed (all of the antenna gains discussed below are main lobe gains).

The path transmission gain corresponding to a sensing signal can be expressed as shown by Formula 4 below:

$$\begin{cases} h_{i,i}^t = \frac{G_t G_r \sigma_{i,i}^{RCS} \lambda^2}{(4\pi)^3 R_i^4} \\ h_{i,j}^t = \frac{G_t G_r \sigma_{i,j}^{RCS} \lambda^2}{(4\pi)^3 R_i^2 R_j^2} \end{cases} \quad \text{Formula 4}$$

wherein, $h_{i,i}^t$ represents a path transmission gain of a sensing signal that is transmitted by a transmitter of the ith on-board device and, after reaching a detection target, returns to a receiver of the ith on-board device; $h_{i,j}^t$ represents a path transmission gain of a sensing signal that is transmitted by the jth on-board device, and after reaching a detection target, is transmitted to a receiver of the ith on-board device; $G_t$ represents a transmitting antenna gain; $G_r$ represents a receiving antenna gain; $\sigma_{i,i}^{RCS}$ represents an effective Radar Cross Section (RCS) of a detection target; $\sigma_{i,i}^{RCS}$ represents a target RCS from the jth on-board device to the ith on-board device; $\lambda$ represents a wavelength; $R_i$ represents the distance from the ith on-board device to the detection target; and $R_j$ represents the distance from the jth on-board device to the detection target.

Assume that all the path transmission gains are fixed in the current observation duration. When the time allocation index of the jth on-board device is smaller than n, the interference of a communication signal of the jth on-board device on a sensing signal of the ith on-board device in the communication duration of the jth on-board device can be expressed as shown by Formula 5 below:

$$I_i^{r-com} = \sum_{j \in N_n} P_j G_t g_{t,j}^{ch-r} G_r \quad \text{Formula 5}$$

wherein, $P_j$ represents the transmission power of the communication signal of the jth on-board device; $\mathcal{N}$ represents the set of time allocation indexes corresponding to on-board devices of which the time allocation index is smaller than n; $G_t$ represents the transmitting antenna gain; $g_{i,j}^{ch-r}$ represents a path transmission attenuation gain of a communication signal of the jth on-board device that is transmitted to the ith on-board device in the communication duration of the jth on-board device; and $G_r$ represents the receiving antenna gain.

When the time allocation index of the jth on-board device is larger than n, the interference of a sensing signal of the jth on-board device on a sensing signal of the ith on-board device during a radar duration of the ith on-board device can be expressed as shown by Formula 6 below:

$$I_i^{r-rad} = \sum_{j \in \mathcal{N} \setminus \mathcal{N}_n} h_{i,j}^t P_j \qquad \text{Formula 6}$$

wherein, $h_{i,j}^t$ represents a path transmission gain of the sensing signal that is transmitted by a transmitter of the jth on-board device, and after reaching a detection target, is transmitted to a receiver of the ith on-board device; $P_j$ represents the transmission power of the sensing signal of the jth on-board device; and $\mathcal{N} \setminus \mathcal{N}$ represents the set of time allocation indexes corresponding to the on-board devices whose time allocation index is larger than n.

By combining the above-described two types of interference, $SINR_{rad}$ of the ith on-board device in its radar duration in the time range of $\bar{a}_n - \bar{a}_{n-1}$, $1 \le n \le I_i$ can be expressed as shown by Formula 7 below, wherein, $SINR_{rad}$ represents Signal to Interference plus Noise Ratio (SINR) of a sensing signal with interference:

$$\gamma_i^{rad} = \frac{h_{i,i}^t P_i}{I_i^{r-rad} + I_i^{r-com} + N_0 B} \qquad \text{Formula 7}$$

wherein, $h_{i,i}^t$ represents a path transmission gain of a sensing signal that is transmitted by a transmitter of the ith on-board device, and after reaching a detection target, returns to a receiver of the ith on-board device; $P_i$ represents the transmission power of the sensing signal of the ith on-board device; $I_i^{r-com}$ represents the interference of a communication signal of the jth on-board device on the sensing signal of the ith on-board device in a communication duration of the jth on-board device when the time allocation index of the jth on-board device is smaller than n, $I_i^{r-rad}$ represents the interference of a sensing signal of the jth on-board device on the sensing signal of the ith on-board device during the radar duration of the ith on-board device when the time allocation index of the jth on-board device is larger than n; $N_0$ represents a background noise power spectral density; and B represents the total frequency bandwidth of electromagnetic waves transmitting the sensing signal and the communication signal.

Based on Formula 7 and Formula 3, the sensing information rate of the ith on-board device can be expressed as shown by Formula 8 below:

$$R_i^{rad} = B_{rad} \sum_{n=1}^{I_t} (\bar{a}_n - \bar{a}_{n-1}) \log_2(1 + \gamma_i^{rad}) \qquad \text{Formula 8}$$

wherein, $B_{rad}$ represents a frequency bandwidth occupied by the sensing signal; $I_i$ represents the time allocation index corresponding to the ith on-board device; $\bar{a}_n$ represents the nth normalized value in the second series; $\bar{a}_{n-1}$ represents the n−1th normalized value in the second series; and $\gamma_i^{rad}$ represents the $SINR_{rad}$ of the ith on-board device in its radar duration in the time range of $\bar{a}_n - \bar{a}_{n-1}$, $1 \le n \le I_i$, $SINR_{rad}$ representing the Signal to Interference plus Noise Ratio (SINR) of the sensing signal with interference.

Based on Formula 8, the sensing total information rate corresponding to a situation where N on-board devices establish communicative interconnection can be expressed as shown by Formula 9 below:

$$R^{rad} = \sum_{i=1}^{N} R_i^{rad} \qquad \text{Formula 9}$$

Figure 3:
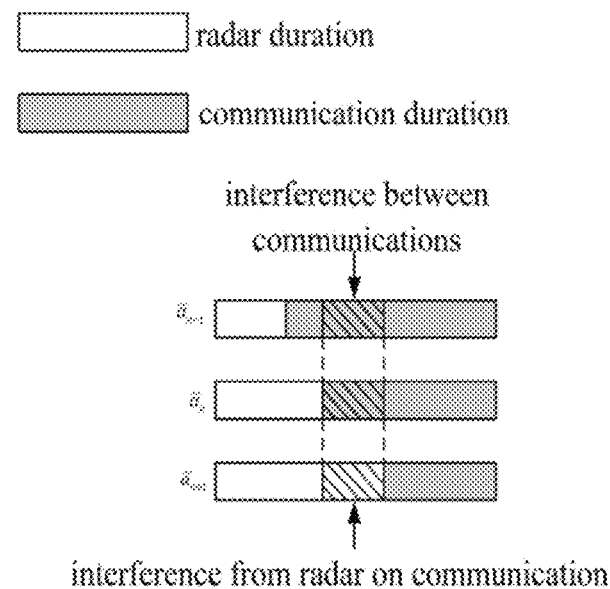
FIG. 3 is another schematic view of analysis of potential interference provided by an embodiment of the present application.

In reference to FIG. 3, regarding the ith on-board device while in its communication duration, two types of interference exist during the time range of $\bar{a}_{n+1} - \bar{a}_n$, $1 \le n \le I_i$: when the time allocation index of another on-board device (the kth on-board device) is smaller than n, inference of a communication signal of the kth on-board device on a communication signal of the ith on-board device during the communication duration of the ith on-board device; when the time allocation index of another on-board device (the kth on-board device) is larger than n, inference of a sensing signal of the kth on-board device on a communication signal of the ith on-board device during the radar duration of the kth on-board device.

When the time allocation index of the kth on-board device is smaller than n, the interference of a communication signal of the kth on-board device on a communication signal of the kth on-board device in the communication duration of the kth on-board device can be expressed as shown by Formula 10 below $$I_i^{c-com} = \sum_{k \in N_n, k \ne j} P_k G_t g_{i,k}^{ch} G_r \qquad \text{Formula 10}$$

wherein, $P_k$ the transmission power of the communicating signal of the kth on-board device; $G_t$ represents a transmitting antenna gain; $G_r$ represents a receiving antenna gain; and $g_{i,k}^{ch}$ represents a path transmission gain of a communication signal of the kth on-board device that is transmitted to the ith on-board device in the communication duration of the ith on-board device.

When the time allocation index of the kth on-board device is larger than n, the interference of a sensing signal of the kth on-board device on a communicating signal of the ith on-board device during a radar duration of the kth on-board device can be expressed as shown by Formula 11 below:

$$I_i^{c-rad} = \sum_{k \in N/N_n, k \ne j} P_k \frac{G_t G_r \lambda^2}{(4\pi)^2 d_{i,k}^2} \qquad \text{Formula 11}$$

wherein, $P_k$ represents the transmission power of the communication signal of the kth on-board device; $G_t$ represents the transmitting antenna gain; $G_r$ represents the receiving antenna gain; and $d_{i,k}$ represents the distance between the ith on-board device and the kth on-board device.

By combining the above-described two types of interference, the $SINR_{com}$ of the ith on-board device in its communication duration in the time range of $\bar{a}_{n+1} - \bar{a}_n$, $1 \le n \le I_i$ can be expressed as shown by Formula 12 below, wherein, $SINR_{com}$ represents Signal to Interference plus Noise Ratio (SINR) of a communicating signal with interference:

$$\gamma_i^{com} = \frac{P_i G_t g_{i,k}^{ch} G_r}{I_i^{c-com} + I_i^{c-rad} + N_0 B} \qquad \text{Formula 12}$$

wherein, $P_i$ represents a transmitting power of the communication signal of the ith on-board device; $G_t$ represents a transmitting antenna gain; $G_r$ represents a receiving antenna gain; $g_{i,k}^{ch}$ represents a path transmission gain of the communication signal of the kth on-board device that is transmitted to the ith on-board device in the communication duration of the ith on-board device; $I_i^{c\text{-}com}$ represents the interference of the communication signal of the kth on-board device on the communication signal of the ith on-board device during the communication duration of the kth on-board device when the time allocation index of the kth on-board device is smaller than n; $I_i^{c\text{-}rad}$ represents the interference of the sensing signal of the kth on-board device on the communication signal of the ith on-board device during the radar duration of the kth on-board device when the time allocation index of the kth on-board device is larger than n; $N_0$ represents a background noise power spectral density; and B represents the total frequency bandwidth of electromagnetic waves transmitting the sensing signal and the communication signal.

Based on Formula 12 and Formula 1, the communication information rate of the ith on-board device can be expressed as shown by Formula 13 below:

$$R_i^{com} = B_{com} \sum_{n=I_i}^{N} (\bar{a}_{n+1} - \bar{a}_n) \log_2(1 + \gamma_i^{com}) \quad \text{Formula 13}$$

wherein, $B_{com}$ represents a frequency bandwidth occupied by the communicating signal; N represents the total number of on-board devices that have established communicative interconnection; $I_i$ represents the time allocation index corresponding to the ith on-board device; $\bar{a}_n$ represents the nth normalized value in the second series; $\bar{a}_{n+1}$ represents the n+1th normalized value in the second series; and $\gamma_i^{com}$ represents the $SINR_{com}$ of the ith on-board device in its communication duration in the time range of $\bar{a}_{n+1} - \bar{a}_n$, $1 \leq n \leq I_i$, $SINR_{com}$ representing the Signal to Interference plus Noise Ratio (SINR) of the communication signal with interference.

Based on Formula 13, the communication total information rate corresponding to a situation where N on-board devices establish communicative interconnection can be expressed as shown by Formula 14 below $$R^{com} = \sum_{i=1}^{N} R_i^{com} \quad \text{Formula 14}$$

In an embodiment, the target function of each of the on-board devices can be constructed as: using the maximization of a weighted average of the sensing total information rate and the communication total information rate of a plurality of on-board devices as an optimization target, and for each of the on-board devices, using the communication information rate of the on-board device not smaller than the sensing information rate of the on-board device as the first constraint corresponding to the on-board device; and, using limiting any time allocation ratio to be tested such that it belongs to a preset value set, as the second constraint corresponding to the on-board device.

In a situation, the preset value set can be limited as $$\Omega_t = \left[\frac{1}{N_s}, \frac{2}{N_s}, \dots, \frac{N_s - 1}{N_s}\right].$$

The second constraint can then be expressed as $$\forall a_n \in \Omega_t = \left[\frac{1}{N_s}, \frac{2}{N_s}, \dots, \frac{N_s - 1}{N_s}\right],$$

wherein, $N_s$ represents the number of sub-frames contained in a communication frame, and $a_n$ represents the time allocation ratio to be tested of the nth determination.

In this situation, the target function of each of the on-board devices can be expressed as shown by Formula 15 below:

$$\max_a w_R R_{rad} + w_C R_{com} \quad \text{Formula 15}$$

$$\text{s.t.} \quad C1: R_i^{rad} \leq R_i^{com}$$

$$C2: \forall a_n \in \Omega_t = \left[\frac{1}{N_s}, \frac{2}{N_s}, \dots, \frac{N_s - 1}{N_s}\right]$$

wherein, $w_R$ represents a weight factor of a sensing function, $w_R \geq 0$; $w_C$ represents a weight factor of a communication function, $w_C \geq 0$; $R_{rad}$ represents the sensing total information rate corresponding to the situation where N on-board devices establish communicative interconnection; $R_{com}$ represents the communication total information rate corresponding to the situation where N on-board devices establish communicative interconnection; $R_i^{rad}$ represents the sensing information rate of the ith on-board device; $R_i^{com}$ represents the communication information rate of the ith on-board device; and a represents a time allocation ratio to be tested.

Using $R_i^{rad} \leq R_i^{com}$ as the first constraint contained in the target function of each of the on-board devices corresponding to the on-board device, means that after a time allocation ratio to be tested is inputted into the target function of each of the on-board devices, the target function value of each of the on-board devices is valid only when it is ensured that the communication information rate of the on-board device is not smaller than the sensing information rate of the on-board device, so that it can be ensured that the quantity of sensing information of each of the on-board devices can be completely transmitted in the communication duration of transmitting sensing information and other information of each of the on-board devices.

In addition, the weight factor of a sensing function and the weight factor of a communication function can be both adaptively adjusted based on different application scenarios and needs, so as to achieve dynamic allocation driven by different tasks.

In another embodiment, the constructing the target function of each of the on-board devices can be simplified by: using the maximization of the sensing total information rate of a plurality of on-board devices as an optimization target, and for each on-board device, using the communication information rate of the on-board device not smaller than the sensing information rate of the on-board device as the first constraint corresponding to the on-board device; and, using limiting any time allocation ratio to be tested such that it belongs to a preset value set, as the second constraint corresponding to the on-board device.

In this embodiment, a minimal communication need of each of the on-board devices can be set so that a minimal requirement can be met in a communication duration. The first constraint corresponding to each of the on-board devices is: the communication information rate of the on-board device being not smaller than the sensing information rate of the on-board device, can be understood as that, the first constraint corresponding to each of the on-board devices has limited the quantity of communication information of each of the on-board devices, that is, the quantity of communication information of each of the on-board devices is not smaller than an estimated quantity of sensing information of each of the on-board devices. As the estimated quantity of sensing information of each of the on-board devices=estimated sensing information rate×detection duration of detecting sensing information of each of the on-board devices, the estimated quantity of sensing information of each of the on-board devices can be obtained by calculation using Formula 3. Thus, a minimal value of the quantity of communication information of each of the on-board devices can be obtained.

In addition, in this embodiment, in a situation, the preset value set can be limited as $$\Omega_t = \left[\frac{1}{N_s}, \frac{2}{N_s}, \ldots, \frac{N_s-1}{N_s}\right].$$

The second constraint can then be expressed as $$\forall a_n \in \Omega_t = \left[\frac{1}{N_s}, \frac{2}{N_s}, \ldots, \frac{N_s-1}{N_s}\right],$$

wherein $N_s$ represents the number of sub-frames contained in a communication frame, and $a_n$ represents the time allocation ratio to be tested of the nth determination.

In this situation, the target function of each of the on-board devices can be expressed as shown by Formula 16 below:

$$\max_a R^{rad}$$

$$\text{s.t. } C1: R_i^{rad} \leq R_i^{com}$$
$$C2: \forall a_n \in \Omega_t = \left[\frac{1}{N_s}, \frac{2}{N_s}, \ldots, \frac{N_s-1}{N_s}\right]$$

Formula 16 wherein, $R^{rad}$ represents a sensing total information rate corresponding to a situation where N on-board devices establish communicative interconnection, $R_i^{rad}$ represents a sensing information rate of the ith on-board device, $R_i^{com}$ represents a communication information rate of the ith on-board device; and a represents the time allocation ratio to be tested.

Using the target function constructed in the present embodiment, on the one hand, it can reduce the amount of calculation for calculating the target function value; on the other hand, by inputting the time allocation ratio to be tested for testing, the sensing total information rate of a plurality of on-board devices can be maximized, so that the time allocation results of a plurality of on-board devices can be finally determined, and the total amount of sensing information of a plurality of on-board devices can be maximized, thereby improving vehicles' beyond-horizon sensing capabilities.

S120: determining a plurality of time allocation ratios contained in the value set, in the order from small to large, as the time allocation ratio to be tested respectively.

For example, regarding the value set $$\Omega_t = \left[\frac{1}{N_s}, \frac{2}{N_s}, \ldots, \frac{N_s-1}{N_s}\right],$$

the time allocation ratio to be tested determined for the first time should be $$a_1 = \frac{1}{N_s},$$

the time allocation ratio to be tested determined for the first time should be $$a_2 = \frac{2}{N_s}$$

so on and so forth, the time allocation ratio to be tested determined for the first time should be $$a_n = \frac{N_s-1}{N_s}.$$

S130: inputting a determined time allocation ratio to be tested into the target functions of the plurality of on-board devices respectively, to obtain a target function value of each of the on-board devices.

For example, the time allocation ratio to be tested determined for the first time is $$a_1 = \frac{1}{N_s},$$

if the target function of each of the on-board devices is constructed as Formula 16 introduced in S110, reference can be made to the relevant introduction in S110, $a_n$ is used to replace $\bar{a}_n$ that appears in each formula introduced in S110, and Formulas 1-14 are combined to calculate the target function value $D_i$ of each of the on-board devices when the time allocation ratio of each of the on-board devices is $$a_1 = \frac{1}{N_s},$$

reference is made to the following formula 17 for details:

$$D_t = \max_a R^{rad} = \max_a \sum_{i=1}^{N} R_i^{rad} = \max_a \sum_{i=1}^{N}\left[B_{rad}\sum_{n=1}^{l_t}(a_n - a_{n-1})\log_2(1 + \gamma_i^{rad})\right]$$

Formula 17

-continued $$\text{s.t.} \quad C1: \left[ B_{rad} \sum_{n=1}^{I_7} (a_1 - a_0) \log_2(1 + \gamma_i^{rad}) \right] \leq \left[ B_{com} \sum_{n=1;}^{N} (a_2 - a_1) \log_2(1 + \gamma_i^{com}) \right]$$

$$C2: \forall\, a_n \in \Omega_i = \left[ \frac{1}{N_s}, \frac{2}{N_s}, \ldots, \frac{N_s - 1}{N_s} \right]$$

wherein, $B_{rad}$ represents a frequency bandwidth occupied by the sensing signal; $B_{com}$ represents a frequency bandwidth occupied by the communicating signal; N represents the total number of on-board devices that have established communicative interconnection; $I_i$ represents the time allocation index corresponding to the ith on-board device; $a_n$ represents the time allocation ratio to be tested determined for the nth time; $a_{n-1}$ represents the time allocation ratio to be tested determined for the n−1th time; $a_0$ is a constant and $a_0 = 0$; $\gamma_i^{rad}$ represents the $\text{SINR}_{rad}$ of the ith on-board device in its radar duration in the time range $\bar{a}_n - \bar{a}_{n-1}$, $1 \leq n \leq I_i$, $\text{SINR}_{rad}$ representing the Signal to Interference plus Noise Ratio (SINR) of the sensing signal with interference; and $\gamma_i^{com}$ represents the $\text{SINR}_{com}$ of the ith on-board device in its communication duration in the time range of $\bar{a}_{n+1} - \bar{a}_n$, $1 \leq n \leq I_i$, $\text{SINR}_{com}$ representing the Signal to Interference plus Noise Ratio (SINR) of the communication signal with interference.

S140: for the target function value of each of the on-board devices, judging whether the target function value of the on-board device satisfies both a preset condition, and the first constraint corresponding to the on-board device; if the result of the judgment is that the target function value of the on-board device does not satisfy both a preset condition, and the first constraint corresponding to the on-board device, returning to execute Step 120; if the result of the judgment is that the target function value of the on-board device satisfies both a preset condition, and the first constraint corresponding to the on-board device, executing Step 150 of determining the current time allocation ratio to be tested as a time allocation result of the on-board device.

For example, the preset condition may be to achieve an optimization goal. Referring to the relevant introduction in S110, in the first embodiment, when the maximization of a weighted average of the sensing total information rate and the communication total information rate of a plurality of on-board devices is used as an optimization target, the preset condition can be to achieve the maximization of a weighted average of the sensing total information rate and the communication total information rate of a plurality of on-board devices. In the second embodiment, when the maximization of the sensing total information rate of the plurality of on-board devices is used as an optimization target, the preset condition can be to achieve the maximization of the sensing total information rate of the plurality of on-board devices.

Using the preset condition in the second embodiment, when the target function value of the on-board device satisfies the preset condition, the finally determined time allocation results of the plurality of on-board devices can maximize the amount of sensing total information of the plurality of on-board devices, thereby improving vehicles' beyond-horizon sensing capabilities.

Since the first constraint corresponding to the on-board device included in the target function of each of the on-board devices imposes limitation that: the target function value of each of the on-board devices is valid only when it is ensured that the communication information rate of the on-board device is not smaller than the sensing information rate of the on-board device. Therefore, the target function value of the on-board device satisfies the first constraint, then it can be ensured that the quantity of sensing information of each of the on-board devices can be completely transmitted in the communication duration of transmitting sensing information and other information of each of the on-board devices.

It can be seen that by applying the embodiment of the present application, in the case that it is ensured that the quantity of sensing information of each of the on-board devices can be completely transmitted in the communication duration of transmitting sensing information and other information of each of the on-board devices, the optimal time allocation ratio can be determined for each of the on-board devices by iteration, therefore better balancing the performance of integral sensing and communication.

In an embodiment, the method in FIG. 1 in the embodiment of the present application can be set to be executed at intervals of a preset period of time. Since the time allocation ratio of each of the on-board devices changes, the SINR parameters of the sensing device and communication device corresponding to each of the on-board devices will change. According to Formula 8 and Formula 13, the sensing information rate and communication information rate of each of the on-board devices will also vary and, in turn, for each of the on-board device, the constructed target function will be different each time. Therefore, through this embodiment, dynamic adjustment of the time allocation ratio of each of the on-board devices can be realized, so as to improve the utilization efficiency of time resources.

Figure 4:
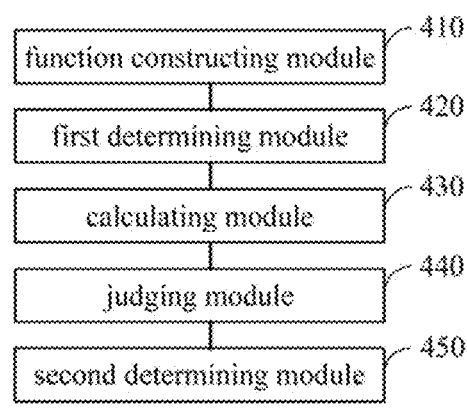
FIG. 4 is a schematic structural view of a time allocation equipment based on an on-board device provided by an embodiment of the present application.

Corresponding to the method embodiment in FIG. 1, an embodiment of the present application also provide a time allocation equipment based on an on-board device, as shown in FIG. 4, the equipment comprises: a function constructing module 410, a first determining module 420, a calculating module 430, a judging module 440, a second determining module 450, wherein, the function constructing module 410 is configured to construct target functions of a plurality of on-board devices; wherein, the target function of each of the on-board devices contains a sensing total information rate expression of the plurality of on-board devices, and a first constraint and a second constraint corresponding to the on-board device; the sensing total information rate expression contains an expression that represents a time allocation ratio to be tested of each of the on-board devices; the first constraint is that a communication information rate of the on-board device is not smaller than a sensing information rate of the on-board device; the second constraint is that any time allocation ratio to be tested belongs to a preset value set containing a plurality of time allocation ratios;

the first determining module 420 is configured to determine the plurality of time allocation ratios contained in the value set, in the order from small to large, as the time allocation ratio to be tested respectively;

the calculating module 430 is configured to input a determined time allocation ratio to be tested into the target functions of the plurality of on-board devices respectively, to obtain a target function value of each of the on-board device;

the judging module 440 is configured to, for the target function value of each of the on-board devices, judge whether the target function value of the on-board device satisfies both a preset condition, and the first constraint corresponding to the on-board device; if the result of the judgment is that the target function value of the on-board device does not satisfy both a preset condition, and the first constraint corresponding to the on-board device, the first determining module 420 is triggered; if the result of the judgment is that the target function value of the on-board device satisfies both a preset condition, and the first constraint corresponding to the on-board device, the second determining module 150 is triggered;

the second determining module 450 is configured to determine the current time allocation ratio to be tested as a time allocation result of the on-board device if the judging module judges that the target function value of the on-board device satisfies both a preset condition, and the first constraint corresponding to the on-board device.

In an embodiment, the preset condition can be: achieving maximization of the sensing total information rate of the plurality of on-board devices.

When the target function value of the on-board device satisfies the preset condition, the finally determined time allocation results of the plurality of on-board devices can maximize the amount of sensing total information of the plurality of on-board devices, thereby improving vehicles' beyond-horizon sensing capabilities.

In an embodiment, the second constraint can be:

$$\forall a_n \in \Omega_t = \left[\frac{1}{N_s}, \frac{2}{N_s}, \ldots, \frac{N_s-1}{N_s}\right],$$

wherein, $\Omega_t$ represents the value set of the time allocation ratio to be tested, $N_s$ represents the number of sub-frames contained in a communication frame, and $a_n$ represents a time allocation ratio to be tested of the nth determination.

In the event that the preset condition is achieving maximization of the sensing total information rate of the plurality of on-board devices and the second constraint is $$\forall a_n \in \Omega_t = \left[\frac{1}{N_s}, \frac{2}{N_s}, \ldots, \frac{N_s-1}{N_i}\right],$$

the target function of each of the on-board devices can be:

$$\max_a R^{rad}$$

$$\text{s.t. } C1: R_i^{rad} \le R_i^{rad}$$

$$C2: \forall a_n \in \Omega_t = \left[\frac{1}{N_s}, \frac{2}{N_s}, \ldots, \frac{N_s-1}{N_s}\right]$$

wherein, $R^{rad}$ represents a sensing total information rate of the plurality of on-board devices, a represents the time allocation ratio to be tested, $R_t^{rad}$ represents a sensing information rate of the ith on-board device, $R_i^{com}$ represents a communication information rate of the ith on-board device, C1: $R_t^{rad} \le R_i^{com}$ represents the first constraint, and $$C2: \forall a_n \in \Omega_t = \left[\frac{1}{N_s}, \frac{2}{N_s}, \ldots, \frac{N_s-1}{N_s}\right]$$

represents the second constraint.

Using the target function constructed in the present embodiment, on the one hand, it can reduce the amount of calculation for calculating the target function value; on the other hand, by inputting the time allocation ratio to be tested for testing, the sensing total information rate of the plurality of on-board devices can be maximized, so that the time allocation results of the plurality of on-board devices can be finally determined, and the amount of sensing total information of the plurality of on-board devices can be maximized, thereby improving vehicles' beyond-horizon sensing capabilities.

By applying the equipment provided by the embodiments of the present application, since the target function of each of the on-board devices is limited by the first constraint corresponding to the on-board device, in other words, after the determined time allocation ratio to be tested is inputted into the target function of each of the on-board devices, the target function value of each of the on-board devices is valid only when it is ensured that the communication information rate of the on-board device is not smaller than the sensing information rate of the on-board device, so that it can be ensured that the quantity of sensing information of each of the on-board devices can be completely transmitted in the communication duration of transmitting sensing information and other information of each of the on-board devices; for the target function value of each of the on-board devices, it is judged whether the target function value of the on-board device satisfies both a preset condition, and the first constraint corresponding to the on-board device until the result of the judgment is that the target function value of the on-board device satisfies both a preset condition, and the first constraint corresponding to the on-board device, the current time allocation ratio to be tested is determined as the time allocation result of the on-board device, thus in the case that it is ensured that the quantity of sensing information of each of the on-board devices can be completely transmitted in the communication duration of transmitting sensing information and other information of each of the on-board devices, the optimal time allocation ratio can be determined for each of the on-board devices by iteration, therefore better balancing the performance of integral sensing and communication.

Figure 5:
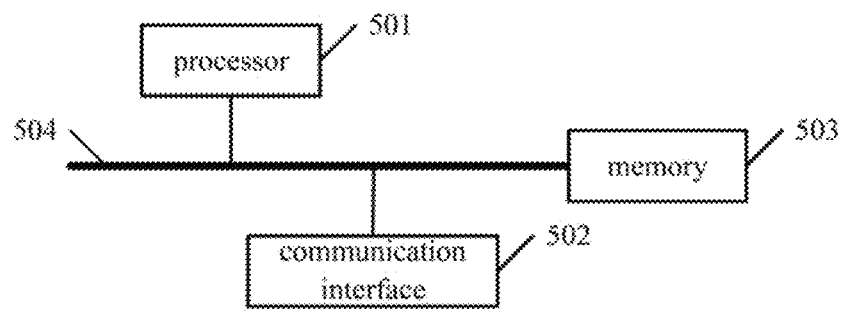
FIG. 5 is a schematic structural view of an electronic device provided by an embodiment of the present application.

An embodiment of the present application also provides electronic device, as shown in FIG. 5, comprising a processor 501, a communication interface 502, a memory 503 and a communication bus 504, wherein, the processor 501, the communication interface 502 and the memory 503 communicate with each other through the communication bus 504;

the memory 503 is configured to store computer programs;

the processor 501 is configured to implement the following steps when executing the program stored in the memory 503:

constructing target functions of a plurality of on-board devices; wherein, the target function of each of the on-board devices contains a sensing total information rate expression of the plurality of on-board devices, and a first constraint and a second constraint corresponding to the on-board device; the sensing total information rate expression contains an expression that represents a time allocation ratio to be tested of each of the on-board devices; the first constraint is that a communication information rate of the on-board device is not smaller than a sensing information rate of the on-board device; the second constraint is that any time allocation ratio to be tested belongs to a preset value set containing a plurality of time allocation ratios;

determining the plurality of time allocation ratios contained in the value set, in the order from small to large, as the time allocation ratio to be tested respectively;

inputting a determined time allocation ratio to be tested into the target functions of the plurality of on-board devices respectively, to obtain a target function value of each of the on-board devices;

for the target function value of each of the on-board devices, judging whether the target function value of the on-board device satisfies both a preset condition, and the first constraint corresponding to the on-board device;

if the result of the judgment is that the target function value of the on-board device does not satisfy both a preset condition, and the first constraint corresponding to the on-board device, returning to execute the step of determining the plurality of time allocation ratios contained in the value set, in the order from small to large, as the time allocation ratio to be tested respectively;

if the result of the judgment is that the target function value of the on-board device satisfies both a preset condition, and the first constraint corresponding to the on-board device, determining the current time allocation ratio to be tested as a time allocation result of the on-board device.

For the specific implementation of the above steps and related explanations, reference may be made to the method embodiment shown in FIG. 1 above, and details are not repeated here.

By applying the electronic device provided by the embodiments of the present application, since the target function of each of the on-board devices is limited by the first constraint corresponding to the on-board device, in other words, after the determined time allocation ratio to be tested is inputted into the target function of each of the on-board devices, the target function value of each of the on-board devices is valid only when it is ensured that the communication information rate of the on-board device is not smaller than the sensing information rate of the on-board device, so that it can be ensured that the quantity of sensing Information of each of the on-board devices can be completely transmitted in the communication duration of transmitting sensing information and other information of each of the on-board devices; for the target function value of each of the on-board devices, it is judged whether the target function value of the on-board device satisfies both a preset condition, and the first constraint corresponding to the on-board device until the result of the judgment is that the target function value of the on-board device satisfies both a preset condition, and the first constraint corresponding to the on-board device, the current time allocation ratio to be tested is determined as the time allocation result of the on-board device, thus in the case that it is ensured that the quantity of sensing information of each of the on-board devices can be completely transmitted in the communication duration of transmitting sensing information and other information of each of the on-board devices, the optimal time allocation ratio can be determined for each of the on-board devices by iteration, therefore better balancing the performance of integral sensing and communication.

The communication bus mentioned in the above electronic device may be a Peripheral Component Interconnect (PCI) bus or an Extended Industry Standard Architecture (EISA) bus or the like. The communication bus can be classified into an address bus, a data bus, a control bus, and the like. For convenience of representation, only one thick line is used in the drawings, but it does not mean that there is only one bus or one type of bus.

The communication interface is used for communication between the electronic device and other devices.

The memory may include a random access memory (RAM), and may also include a non-volatile memory (NVM), such as at least one disk memory. In some embodiments of the present application, the memory may also be at least one storage equipment located far away from the aforementioned processor.

The above-mentioned processor can be a general-purpose processor, including a central processing unit (CPU), a network processor (NP), and the like; it can also be a digital signal processor (DSP), an application specific integrated circuit (ASIC), Field-Programmable Gate Array (FPGA) or other programmable logic devices, discrete gate or transistor logic devices, discrete hardware components.

In yet another embodiment provided by the present application, a computer-readable storage medium is also provided, in which a computer program is stored and when the computer program is executed by a processor, the steps of the time allocation method based on an on-board device shown in FIG. 1 is implemented.

In yet another embodiment provided by the present application, a computer program product is also provided, which includes computer instructions used to cause the computer to implement the steps of the time allocation method based on an on-board device shown in FIG. 1.

In the above embodiments, all or part of them may be implemented by software, hardware, firmware or any combination thereof. When implemented using software, it may be implemented in whole or in part in the form of a computer program product. The computer program product includes one or more computer instructions. When the computer program instructions are loaded and executed on the computer, the processes or functions according to the embodiments of the present application will be generated in whole or in part. The computer can be a general purpose computer, a special purpose computer, a computer network, or other programmable devices. The computer instructions may be stored in or transmitted from one computer-readable storage medium to another computer-readable storage medium, for example, the computer instructions may be transmitted from a website, computer, server or data transmission center to another website site, computer, server, or data center by wired (eg, coaxial cable, fiber optic, digital subscriber line (DSL)) or wireless (eg, infrared, wireless, microwave, etc.) means. The computer-readable storage medium may be any available medium that can be accessed by a computer, or a data storage device such as a server or a data center integrated with one or more available media. The available medium may be a magnetic medium (for example, a floppy disk, a hard disk, or a magnetic tape), an optical medium (for example, DVD), or a semiconductor medium (for example, a Solid State Disk (SSD)).

It should be noted that in the present specification, relational terms such as first and second are only used to distinguish one entity or operation from another entity or operation, and do not necessarily require or imply that there is such actual relationship between these entities or operations. Furthermore, the term "include", "comprise" or any other variation thereof is intended to cover a non-exclusive inclusion such that a process, method, article, or apparatus comprising a set of elements includes not only those elements, but also includes other elements not expressly listed or also include elements inherent in such a process, method, article, or device. Without further limitations, an element defined by the phrase "comprise a . . . " does not exclude the presence of additional identical elements in the process, method, article or apparatus comprising said element.

Each embodiment in the present specification is described in a related manner, the same and similar parts of each embodiment can be referred to each other, and each embodiment focuses on the differences from other embodiments. In particular, for the equipment, the electronic device, and the computer-readable storage media, since they are basically similar to the method embodiments, the description is relatively simple, and for relevant parts, reference can be made to part of the description of the method embodiments.

The above descriptions are only preferred embodiments of the present application, and are not intended to limit the protection scope of the present application. Any modifications, equivalent replacements, improvements, and the like made within the spirit and principles of this application fall within the protection scope of this application.

What is claimed is:

1. A time allocation method based on an on-board device, comprising:
    constructing target functions of a plurality of on-board devices; wherein, the target function of each of the on-board devices contains a sensing total information rate expression of the plurality of on-board devices, and a first constraint and a second constraint corresponding to the on-board device; the sensing total information rate expression contains an expression that represents a time allocation ratio to be tested of each of the on-board devices; the first constraint is that a communication information rate of the on-board device is not smaller than a sensing information rate of the on-board device; the second constraint is that any time allocation ratio to be tested belongs to a preset value set containing a plurality of time allocation ratios;
    determining the plurality of time allocation ratios contained in the preset value set, in an order from small to large, as the time allocation ratio to be tested respectively;
    inputting a determined time allocation ratio to be tested into the target functions of the plurality of on-board devices respectively, to obtain a target function value of each of the on-board devices;
    for the target function value of each of the on-board devices, judging whether the target function value of the on-board device satisfies both a preset condition, and the first constraint corresponding to the on-board device;
    if a result of judging is that the target function value of the on-board device does not satisfy both a preset condition, and the first constraint corresponding to the on-board device, returning to execute the determining the plurality of time allocation ratios contained in the preset value set, in the order from small to large, as the time allocation ratio to be tested respectively;
    if the result of judging is that the target function value of the on-board device satisfies both a preset condition, and the first constraint corresponding to the on-board device, determining a current time allocation ratio to be tested as a time allocation result of the on-board device.

2. The method according to claim 1, wherein, the preset condition is:
    achieving maximization of a sensing total information rate of the plurality of on-board devices.

3. The method according to claim 2, wherein, the second constraint is:

$$\forall\, a_n \in \Omega_t = [\frac{1}{N_s}, \frac{2}{N_s}, \ldots, \frac{N_s-1}{N_s}],$$

wherein, $\Omega_t$ represents the preset value set, $N_s$ represents a number of sub-frames contained in a communication frame, and $a_n$ represents a time allocation ratio to be tested of a nth determination.

4. The method according to claim 3, wherein, the target function of each of the on-board devices is:

$$\max_a R^{rad}$$

$$\text{s.t. } C1: R_i^{rad} \leq R_i^{com}$$

$$C2: \forall\, a_n \in \Omega_t = [\frac{1}{N_s}, \frac{2}{N_s}, \ldots, \frac{N_s-1}{N_s}]$$

wherein, $R^{rad}$ represents the sensing total information rate, $a$ represents the time allocation ratio to be tested, $R_i^{rad}$ represents a sensing information rate of an ith on-board device, $R_i^{com}$ represents a communication information rate of the ith on-board device, C1: $R_i^{rad} \leq R_i^{com}$ represents the first constraint, and $$C2: \forall\, a_n \in \Omega_t = [\frac{1}{N_s}, \frac{2}{N_s}, \ldots, \frac{N_s-1}{N_s}]$$

represents the second constraint.

5. A non-transitory computer-readable storage medium, wherein a computer program is stored in the computer-readable storage medium, and when the computer program is executed by a processor, the method steps according to claim 1 is implemented.

6. An electronic device, comprising a processor, a communication interface, a memory, and a communication bus, wherein the processor, the communication interface, and the memory complete communicate with each other through the communication bus;
    the memory is configured to store computer programs;
    the processor is configured to implement, when executing the program stored in the memory, operations of:
    constructing target functions of a plurality of on-board devices; wherein, the target function of each of the on-board devices contains a sensing total information rate expression of the plurality of on-board devices, and a first constraint and a second constraint corresponding to the on-board device; the sensing total information rate expression contains an expression that represents a time allocation ratio to be tested of each of the on-board devices; the first constraint is that a communication information rate of the on-board device is not smaller than a sensing information rate of the on-board device; the second constraint is that any time allocation ratio to be tested belongs to a preset value set containing a plurality of time allocation ratios;

determining the plurality of time allocation ratios contained in the preset value set, in an order from small to large, as the time allocation ratio to be tested respectively;

inputting a determined time allocation ratio to be tested into the target functions of the plurality of on-board devices respectively, to obtain a target function value of each of the on-board devices;

for the target function value of each of the on-board devices, judging whether the target function value of the on-board device satisfies both a preset condition, and the first constraint corresponding to the on-board device;

if a result of judging is that the target function value of the on-board device does not satisfy both a preset condition, and the first constraint corresponding to the on-board device, returning to execute the determining the plurality of time allocation ratios contained in the preset value set, in the order from small to large, as the time allocation ratio to be tested respectively;

if the result of judging is that the target function value of the on-board device satisfies both a preset condition, and the first constraint corresponding to the on-board device, determining a current time allocation ratio to be tested as a time allocation result of the on-board device.

7. The electronic device according to claim 6, wherein, the preset condition is:

achieving maximization of a sensing total information rate of the plurality of on-board devices.

8. The electronic device according to claim 7, wherein, the second constraint is:

$$\forall a_n \in \Omega_t = [\frac{1}{N_s}, \frac{2}{N_s}, \ldots, \frac{N_s-1}{N_s}],$$

wherein, $\Omega_i$ represents the preset value set, $N_s$ represents a number of sub-frames contained in a communication frame, and $a_n$ represents a time allocation ratio to be tested of a nth determination.

9. The electronic device according to claim 8, wherein, the target function of each of the on-board devices is:

$$\max_a R^{rad}$$

$$\text{s.t. } C1: R_i^{rad} \leq R_i^{com}$$

$$C2: \forall a_n \in \Omega_t = [\frac{1}{N_s}, \frac{2}{N_s}, \ldots, \frac{N_s-1}{N_s}]$$

wherein, $R^{rad}$ represents the sensing total information rate, a represents the time allocation ratio to be tested, $R_i^{rad}$ represents a sensing information rate of an ith on-board device, $R_i^{com}$ represents a communication information rate of the ith on-board device, C1: $R_i^{rad} \leq R_i^{com}$ represents the first constraint, and $$C2: \forall a_n \in \Omega_t = [\frac{1}{N_s}, \frac{2}{N_s}, \ldots, \frac{N_s-1}{N_s}]$$

represents the second constraint.

* * * * *